(12) United States Patent
Koenig et al.

(10) Patent No.: US 9,920,150 B2
(45) Date of Patent: Mar. 20, 2018

(54) PHOSPHORYLATED POLYMERS

(71) Applicant: BASF SE, Ludwigshafen (DE)

(72) Inventors: Alexander Koenig, Bruchsal (DE); Konrad Knoll, Mannheim (DE)

(73) Assignee: BASF SE, Ludwigshafen (DE)

( * ) Notice: Subject to any disclaimer, the term of this patent is extended or adjusted under 35 U.S.C. 154(b) by 8 days.

(21) Appl. No.: 14/896,768

(22) PCT Filed: Jun. 6, 2014

(86) PCT No.: PCT/EP2014/061825
§ 371 (c)(1),
(2) Date: Dec. 8, 2015

(87) PCT Pub. No.: WO2014/198659
PCT Pub. Date: Dec. 18, 2014

(65) Prior Publication Data
US 2016/0130381 A1    May 12, 2016

(30) Foreign Application Priority Data
Jun. 10, 2013 (EP) .................................... 13171206

(51) Int. Cl.
C08F 8/44       (2006.01)
C08F 236/10     (2006.01)
C09K 21/14      (2006.01)
C08L 77/02      (2006.01)
C08L 77/06      (2006.01)
C08F 8/40       (2006.01)

(52) U.S. Cl.
CPC .............. C08F 236/10 (2013.01); C08F 8/40 (2013.01); C08L 77/02 (2013.01); C08L 77/06 (2013.01); C09K 21/14 (2013.01); C08F 2800/20 (2013.01)

(58) Field of Classification Search
None
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 2,863,834 A | 12/1958 | Buckman |
| 2,957,931 A | 10/1960 | Hamilton et al. |
| 3,393,210 A | 7/1968 | Speck |
| 3,577,357 A | 5/1971 | Winkler |
| 3,642,728 A * | 2/1972 | Cantar ............... C08C 19/20 524/575.5 |
| 3,758,640 A * | 9/1973 | Thorpe ............... C08F 279/02 525/63 |
| 5,073,299 A * | 12/1991 | Cook .................. C02F 5/14 210/699 |
| 5,239,010 A * | 8/1993 | Balas ................. C08F 8/36 525/314 |
| 6,245,862 B1 * | 6/2001 | Rajagopalan ........ C08L 77/00 473/373 |
| 2010/0261818 A1 | 10/2010 | Seki | |

FOREIGN PATENT DOCUMENTS

| | | |
|---|---|---|
| CN | 102329479 A | 1/2012 |
| DE | 44 13 177 A1 | 10/1995 |
| DE | 10 2006 045 869 A1 | 4/2008 |
| EP | 0 038 094 A2 | 10/1981 |
| EP | 0 038 582 A2 | 10/1981 |
| EP | 0 039 524 A1 | 11/1981 |
| EP | 0 859 803 B1 | 12/1999 |
| EP | 2 100 919 A1 | 9/2009 |
| EP | 1 984 438 B1 | 3/2010 |
| EP | 2 223 904 A2 | 9/2010 |
| JP | 2009-155436 A | 7/2009 |
| WO | WO 97/40079 A1 | 10/1997 |
| WO | WO 2008/074687 A2 | 6/2008 |
| WO | WO 2012/152805 A1 | 11/2012 |

OTHER PUBLICATIONS

Definition of Carboxyl Group, Dictionary of Chemistry, 6th Ed. 2008.*
International Search Report dated Jul. 7, 2014 in PCT/EP2014/061825.
E. Ye. Nifant'yev, et al., "Hydrophosphorylation of synthetic rubbers" Polymer Science U.S.S.R., vol. 25, No. 2, XP024129331, 1983, pp. 472-479.
J. C. Brosse, et al., "Modification chimique du polybutadiene-1,2 par le phosphonate d'ethyle" European Polymer Journal, vol. 19, No. 12, XP024053499, 1983, pp. 1159-1165.
C. Azuma, et al., "Phosphonylation of a Polypentenamer and Preparation of its Hydrogenated Derivatives" Journal of Polymer Science: Polymer Chemistry Edition, vol. 15, XP055087511, 1977, pp. 547-560.
Richard Sasin, et al., "Phosphorus Derivatives of Fatty Acids. VII. Addition of Dialkyl Phosphonates to Unsaturated Compounds" J. Am. Chem. Soc., vol. 81, Dec. 5, 1959, pp. 6275-6277.
Combined Chinese Office Action and Search Report dated Apr. 19, 2017 in Patent Application No. 201480033052.7 (with partial English language translation and English language Translation of Categories of Cited Documents).

* cited by examiner

*Primary Examiner* — Robert C Boyle
(74) *Attorney, Agent, or Firm* — Oblon, McClelland, Maier & Neustadt, L.L.P.

(57) ABSTRACT

A process is described for the production of phosphorus-containing organic polymers through reaction of dialkyl phosphites with organic polymers comprising carbon-carbon double bonds in the presence of organic compounds that form free radicals under the reaction conditions, with covalent linkage of the phosphorus atom of the dialkyl phosphite to a carbon atom of the organic polymer.

9 Claims, No Drawings

PHOSPHORYLATED POLYMERS

The invention relates to processes for the production of phosphorus-containing organic polymers, to phosphorus-containing organic polymers obtainable by the process, and also to use of these for the flame-retardant modification of combustible solids or for the modification of inorganic oxidic solids, and also to correspondingly modified thermoplastic molding compositions.

The flame-retardant modification of thermoplastic molding compositions by phosphorus-containing compounds such as DEPAL and red phosphorus is known per se. WO 2012/152805 moreover describes the use of cyclic phenoxyphosphazenes and (di)phosphinate salts as flame-retardant ingredients of thermoplastic molding compositions.

Other materials of interest alongside low-molecular-weight phosphorus-containing flame retardants are phosphorylated polymers which can be used in flame retardancy applications.

The synthesis of compounds having a carbon-phosphorus bond is known per se. U.S. Pat. No. 2,957,931 describes processes of this type.

The linkage of dialkyl phosphonates to ethylenically unsaturated compounds is moreover described in J. Am. Chem. Soc. 81, (1959), pp. 6275-6277.

The free-radical addition of dimethyl phosphite to polypentenamer is known from J. Polymer Science, Polymer Chemistry Edition, vol. 15, (1977), pp. 547-560.

Phosphorylation often gives low yields. By way of example, the polypentenamer is reacted with a 20-fold excess of dimethyl phosphite, whereupon the amount of dimethyl phosphonate bonded to the polymer chain was less than 10 mol %.

When monomers are phosphorylated, the resultant phosphorylated monomers have to be polymerized, and this is often technically impossible.

There is therefore a continuing requirement for phosphorylated polymers which are suitable for the flame-retardant modification of combustible solids and which can be produced in an uncomplicated manner.

The invention achieves the object through a process for the production of phosphorus-containing organic polymers through reaction of dialkyl phosphites with organic polymers comprising carbon-carbon double bonds in the presence of organic compounds that form free radicals under the reaction conditions, with covalent linkage of the phosphorus atom of the dialkyl phosphite to a carbon atom of the organic polymer.

The object is also achieved through a phosphorus-containing organic polymer obtainable by said process.

The object is also achieved through the use of phosphorus-containing organic polymers of this type for the flame-retardant modification of combustible solids or for the modification of inorganic oxidic solids.

The object is also achieved through a thermoplastic molding composition comprising a) as component A, from 30 to 95% by weight of at least one thermoplastic polymer which comprises no phosphorus, b) as component B, from 1 to 30% by weight of at least one phosphorus-containing organic polymer of the above type, c) as component C, from 0 to 15% by weight of other flame-retardant auxiliaries, d) as component D, from 0 to 20% by weight of at least one impact-modifying polymer, e) as component E, from 0 to 50% by weight of glass fibers, f) as component F, from 0 to 30% by weight of other additives, where the total amount of components A to F gives 100% by weight.

In the process of the invention, organic polymers which comprise carbon-carbon double bonds are reacted or phosphorylated with dialkyl phosphites in the presence of organic compounds that form free radicals under the reaction conditions.

In the invention it has been found that this type of phosphorylation of the organic polymers is successful with high yields when the affinity of the dialkyl phosphite for the organic polymer is sufficiently high.

This can be ensured by using an adequately polar organic polymer. In the invention it is possible to use organic polymers having sufficient polarity, or organic polymers that are nonpolar or insufficiently polar can be rendered more polar by introduction of polar groups into the polymer.

By way of example, an organic polymer which has more than 65% by weight, based on the organic polymer, of vinylaromatic units generally has sufficient polarity to be phosphorylated. In this case there is no need for introduction of ionic groups.

The polarity of the organic polymer can by way of example be increased through incorporation of polar groups, for example (meth)acrylic acid or its esters, hydroxy(meth)acrylates such as hydroxyethylhexyl acrylate, (meth)acrylamide, acrylonitrile, etc.

As alternative or in addition, maleic anhydride can be applied to the carbon-carbon double bonds of the organic polymer, thus introducing succinic anhydride groups. It is preferable that up to 20%, particularly up to 10%, of the allyl groups or carbon-carbon double bonds are subjected to this type of grafting.

Polar groups can moreover be introduced through hydroboration/oxidation, chloro- or bromomethylation/hydrolysis, or sulfonation. The polar groups can take the form of terminal groups in the polymer chain or else can be present within the polymer chain.

It is preferable in the invention to use, for the reaction, an organic polymer which has, based on the monomer units of the organic polymer, from 0.01 to 50 mol %, particularly from 0.5 to 20 mol %, in particular from 1 to 10 mol %, of ionic groups which can be present entirely or to some extent in salt form. It is therefore possible that the ionic groups are present to some extent or entirely in deprotonated form.

It is preferable that the ionic groups are selected from carboxyl, sulfinate, sulfonate, and/or sulfate groups.

The presence of the ionic groups adapts the polarity of the organic polymers used in the invention to be appropriate to the polarity of the dialkyl phosphites, thus giving adequate affinity between the two components. By this method it is possible to achieve a rapid reaction of the dialkyl phosphites with the carbon-carbon double bonds with high graft yield, while crosslinking or molar mass increase can be substantially prevented.

By way of example, the organic polymer used for the reaction can have been sulfonated.

For the sulfonation it is advantageous that the organic polymer has aromatic groups, since sulfonation of the aromatic groups is then possible under non-aggressive conditions without any attack of the carbon-carbon double bonds or of the allyl groups caused by the sulfonation.

It is therefore preferable that the organic polymer comprises from 10 to 70% by weight, particularly from 20 to 60% by weight, in particular from 30 to 50% by weight, of monomer units comprising aromatic groups, based on the entire organic polymer. Examples of suitable monomers having aromatic groups are vinylaromatic monomers such as styrene or methylstyrene.

The molecular weight of the organic polymer used in the reaction is not critical. It is preferable that the number-average molecular weight (Me) is in the range from 1000 to 1 000 000, particularly in the range from 2000 to 300 000, in particular in the range from 5000 to 200 000.

The organic polymer used for the reaction can be a homopolymer or copolymer. It is preferable that a random copolymer or di- or multiblock copolymer is involved.

The carbon-carbon double bond here can be within the main polymer chain or within a side chain. It is preferable that the carbon-carbon double bond is the main polymer chain.

The organic polymer used in the invention can derive from any desired suitable underlying monomer units. Examples of suitable polymers are described in Hadjichristidis, "[Blockcopolymers" Block copolymers], Wiley, 2003, pp. 4-173 and Hsieh and Quirk, "Anionic Polymerization", Decker, 1996, pp. 261-394.

The polymers can be produced through any of the polymerization methods, for example anionic, cationic, free-radical, or ring-opening metathesis polymerization. The free-radical polymerization process also includes controlled free-radical polymerization processes, for example with use of TEMPO and of similar compounds.

Suitable AB-diblock copolymers can by way of example be produced through anionic polymerization of styrene with isoprene, butadiene, cyclohexadiene, methyl methacrylate, butyl methacrylate, butyl acrylate, 2,3-glycidyl methacrylate, stearyl methacrylate, 2-vinylpyridine, 4-vinylpyridine, ethylene oxide, caprolactone, hexamethylcyclotrisiloxane, ferrophenyldimethylsilane or hexyl isocyanate, and also from alpha-methylstyrene with butadiene, isoprene with 2-vinylpyridine, ethylene oxide, hexamethylcyclotrisiloxane, butadiene with caprolactone or ethylene oxide, methyl methacrylate with butyl methacrylate, and 2-vinylpyridine with butyl methacrylate, caprolactone, or ethylene oxide.

ABA-triblock copolymers are by way of example obtainable through anionic polymerization of styrene/butadiene, styrene/isoprene, p-methylstyrene/butadiene, alpha-methylstyrene/isoprene, tert-butylstyrene/butadiene, 4-vinylpyridine/butadiene, ethylene oxide/isoprene, isoprene/tert-butyl acrylate, tert-butyl methacrylate/isoprene, methyl methacrylate/butadiene, methyl methacrylate/octyl acrylate, glycidyl methacrylate/butadiene, isobornyl methacrylate/butadiene, ethylene oxide/butadiene.

Chemical modifications of the polymers can optionally be carried out as described above by way of example via hydrogenation, hydrolysis, quaternization, sulfonation, hydroboration/oxidation, epoxidization, chloro/bromomethylation, or hydrosilylation.

It is also possible to use the compounds usually used as regulators, for example monocarboxylic acids and dicarboxylic acids, as other functionalizing monomers. For a description reference can also be made to DE-A-44 13 177.

It is also possible to use non-linear block copolymers, for example star-shaped block copolymers, or grafted copolymers, or other complex copolymer architectures. Unsaturated block copolymers can also be attained through ring-opening metathesis polymerization.

The ring-opening metathesis polymerization (ROMP) can use any of the suitable monomers, e.g. oxanorbornene.

Preference is given in the invention to vinylaromatic-diene copolymers having up to 30% by weight total butadiene content. Under the conditions described below for the free-radical phosphorylation process they can be phosphorylated directly with more than 50% yield, based on the double bonds in the polymer. Polymers of this type can have random structure or take the form of linear block polymer with block sequences such as S-B, S-B-S, (S-B)n, B-S-B, (S-B)nS, or B-(S-B)n, or have a star shape by way of example in accordance with the formula (S-B)n-x, (B-S)n-x, (S-B-S)n-x, (B-S-B)n-x, where x is an n-functional coupling agent or initiator molecule with functionality>1. S means a polymer block composed of styrene and/or of another vinylaromatic with identical or different block lengths, and also narrow or broad or multimodal block-length distribution. B means a diene-containing polymer block which can be composed exclusively of diene units, for example butadiene, isoprene, and other dienes, and mixtures of these, but which can also be a random copolymer of said dienes with vinylaromatics, for example made of styrene and butadiene, where the diene/vinylaromatic ratio can vary within the range from 99/1 to 1/99, preferably from 90/10 to 10/90. Within the block, the monomer composition can be constant or can exhibit a gradient. The transition between the individual blocks can be sharp or tapered, and if it is sharp can therefore exhibit a sudden change of composition and if it is tapered can therefore exhibit a polymer section with a monomer gradient.

Vinylaromatic-diene copolymers with more than 30% by weight total butadiene content are likewise within the invention. In order to achieve phosphorylation levels of more than 50%, it is preferable to introduce polar groups, particularly ionic groups.

Materials that can likewise be used advantageously in the invention are graft polymers in which vinylic monomers are grafted onto an olefinically unsaturated polymer. The graft base can be polydienes based on monomers such as butadiene, isoprene, and other alkylbutadienes, or else a mixture of these, or else a mixture of these with vinylaromatics such as styrene, an example being SBR, in particular solution SBR, or else a mixture of these with other vinyl monomers such as acrylonitrile, acrylates and methacrylates. Other materials likewise suitable as graft base are polymers resulting from ring-opening metathesis polymerization, for example polypentenamer, polyoctenamer, polynorbornene, polyoxynorbornene, and other monomers suitable for ring-opening metathesis polymerization. Materials likewise suitable as graft base are vinylaromatic-diene block polymers as described above. It is preferable that the graft base is dissolved in the monomer which, or in the monomer mixture which, is intended for application by grafting in the form of grafted chain. The grafting can optionally take place in the presence of a solvent and of a free-radical initiator. Suitable monomers are vinylaromatics such as styrene, other vinylic monomers such as acrylonitrile, acrylates, methacrylates, and also a combination of these. The molar mass of the grafted chains can be controlled by way of the polymerization temperature and optionally through addition of regulators. It is possible to achieve a wide variation range of the subsequent phosphorus content as required in the application, by way of the molar mass of the graft base and the number, and also molar mass, of the grafted chains. The molar mass range begins in the oligomer region (Mw>500) and extends to 2 million.

The polymers can moreover comprise other reactive groups, e.g. —OH, NCO, etc. These groups can be of importance subsequently for further reactions such as those arising by way of example during the painting of a hot-dip-galvanized steel sheet treated with the phosphonated polymer.

It is particularly preferable in the invention to use elastomeric block copolymers made of at least one hard block A composed of styrene monomers and of at least one elastomeric block B/A composed of styrene monomers and also of dienes, these being as described in WO 97/40079.

Preference is given to elastomeric block copolymers made of at least one block A forming a hard phase and comprising copolymerized units derived from vinylaromatic monomers and of at least one block (B/A) forming a soft phase and comprising copolymerized units of a vinylaromatic monomer and of a diene, where the glass transition temperature $T_9$ of the block A is above 25° C. and that of the block B/A is below 25° C., and the phase volume ratio of block A to block (B/A) is selected in such a way that the proportion of the hard phase, based on the entire block copolymer, is from 1 to 40% by volume and the proportion by weight of the diene is less than 50% by weight, where the relative content of 1,2-linkages of the polydiene, based on the entirety of 1,2- and 1,4-cis/trans linkages is below 15%.

Preferred organic polymers used in the invention comprise copolymerized units of vinylaromatic monomers and diene monomers.

It is possible here that more than 65% by weight, based on the organic polymer used in the reaction, of vinylaromatic units are present, and no ionic groups.

It is also possible that the organic polymer used for the reaction has, in each case based on the polymer, from 10 to 70% by weight, preferably from 20 to 60% by weight, in particular from 30 to 50% by weight, of vinylaromatic units and from 30 to 90% by weight, preferably from 40 to 80% by weight, in particular from 50 to 70% by weight, of diene units as copolymerized units, and that from 0.5 to 5%, preferably from 1 to 4%, in particular from 2 to 3%, of the aromatic units have been sulfonated.

The reaction of dialkyl phosphites with C=C bonds proceeds in the presence of free radicals. These can by way of example derive from peroxides, hydroperoxides, labile C—C compounds, or azo compounds. The half-life time of suitable compounds should be from 20 seconds to 10 hours at the reaction temperature. Typical reaction temperatures are from 50 to 150° C., preferably from 60° C. to 120° C.

It can be advantageous to make additional use of a polymer stabilizer, e.g. a sterically hindered phenol. These compounds reduce crosslinking of the polymer under the reaction conditions.

The molar excess of dialkyl phosphite is preferably from 1 to 50, preferably from 2 to 30, based on the C=C bonds.

The components can be added in various ways. It is preferable to use the dialkyl phosphite as initial charge together with the solvent. The polymer can then be metered into the system together with the free-radical generator. The metering times are preferably from 1 h to 7 days, particularly preferably from 8 h to 48 h.

Correct selection of the solvent can be advantageous. It should be of moderate polarity, and permittivity greater than 5 has been shown to be advantageous in a good many cases. Preference is given to dioxane, dimethoxyethane, diethylene glycol dimethyl ether, and diethylene glycol diethyl ether.

Addition of basic components with pH>8 can be advantageous, and preference is given to using amines (primary, secondary, tertiary), preferably used in small excess, based on the deprotonatable groups in the polymer. It is moreover possible to use organic salts that act as soaps, and also nonionic surfactants, where these can advantageously be used concomitantly as phase transfer catalyst, in amounts of less than 10% by weight, based on the polymer used.

Dialkyl phosphites that can be used are any desired suitable dialkyl phosphites which have identical or different alkyl moieties. Preference is given to di-$C_{1-6}$-alkyl phosphites, particularly di-$C_{1-3}$-alkyl phosphites, in particular dimethyl phosphite or diethyl phosphite.

The resultant phosphorus-containing organic polymers, which have a high degree of phosphorylation, can be used for the flame-retardant modification of polymers, and also after hydrolysis for adhesion on polar surfaces and dispersion of inorganic fillers with oxidic surface.

It is preferable that the degree of phosphorylation, based on the carbon-carbon double bonds present in the organic polymer used for the reaction, is from 10 to 100 mol %, particularly from 40 to 100 mol %, in particular from 60 to 100 mol %.

It can be advantageous to carry out the reaction in the presence of a free-radical scavenger, in order to suppress any crosslinking reaction.

After phosphorylation, the phosphorus-containing organic polymer can be hydrolyzed in order to form phosphonic acid groups. This is particularly advantageous in the modification of inorganic oxidic solids, whereas the flame-retardant modification of combustible solids, preferably of plastics, wood, or natural fibers, uses nonhydrolyzed phosphorus-containing organic polymers.

The phosphorus-containing organic polymers obtainable in the invention are preferably used for the flame-retardant modification of combustible solids, preferably of plastics, wood, or natural fibers, or for the modification of inorganic oxidic solids. The plastics can be BULK plastics, plastics foams, elastomers, dispersions, or coating materials. Inorganic oxidic solids preferably derive from the metals aluminum, silicon, titanium, zinc, or magnesium, or from minerals comprising said elements. It is moreover also possible to modify polymers and color pigments.

It is preferable in the invention to use sulfonated and phosphorylated organic polymers.

The phosphonated polymers can, as described by Azuma, be reacted with HCl gas to give polymers having free phosphonic acid groups. As an alternative, successful ester cleavage is achieved through addition of preferably 1-10% phosphoric acid in water to a polymer solution in the abovementioned ethers and subsequent heating for from 2 to 4 hours, preferably to from 100 to 150° C., optionally in an autoclave.

The phosphonic acid groups assist dispersion of fillers in polymers or solvents. They can therefore also be used in detergents.

The higher the molar mass of the diene block to be phosphorylated, the more difficult it can be to overcome the phase transfer problem between the very nonpolar polydiene or diene-rich styrene-diene copolymer and the polar alkyl phosphonate, i.e. a relatively low degree of phosphorylation is observed, alongside an increasing extent of molar-mass increase and gelling due to crosslinking. The effect of a remote ionic group at the chain end, introduced for example from reaction of the living polymer chain with sulfur dioxide to give the sulfinic acid, is often inadequate. Preference is given to additional incorporation of polar, preferably ionic, groups into the diene chain by way of suitable monomers in order to solve this problem. This can by way of example be achieved through maleation of some diene units. In a preferred route, a styrene unit is incorporated at intervals of from 10 to 20 diene units and is then sulfonated, for example by reaction with a (sub)stoichiometric amount of a sulfonating agent such as chlorosulfonic acid or acetylsulfonate, preferably in a chlorinated hydrocarbon such as 1,2-dichloroethane, preferably at temperatures of from 0 to 25° C. The reaction should take place under particularly mild conditions in order to avoid sulfonation of the polydiene, which then decomposes to give a dark coloration. This procedure is of particular interest when the polymer used is composed mainly of diene and has molar masses above 2000 g/mol, particularly above 5000 g/mol. It increases the degree of phosphorylation achieved for dialkyl and diaryl phosphonates. Polyphosphonic esters of this type are suitable by way of example as flame retardants in thermoplastics, foams, dispersions, and reactive plastics.

They are preferably used for the modification of a thermoplastic molding composition comprising a) as component A, from 30 to 95% by weight of at least one thermoplastic polymer which comprises no phosphorus, b) as component B, from 1 to 30% by weight of at least one phosphorus-containing organic polymer of the invention, c) as component C, from 0 to 15% by weight of other flame-retardant auxiliaries, d) as component D, from 0 to 20% by weight of at least one impact-modifying polymer, e) as component E, from 0 to 50% by weight of glass fibers, f) as component F, from 0 to 30% by weight of other additives, where the total amount of components A to F gives 100% by weight.

Component A here can be selected from any desired suitable polymers. By way of example, it involves a polyamide, polyester, polycarbonate, polyether, polyurethane, polysulfone, polyolefin, or a polymer blend made of two or more thereof.

It is particularly preferable that component A involves a polyamide.

The polyamides preferably used in the invention are produced via reaction of starting monomers selected by way of example from dicarboxylic acids and from diamines or from salts of the dicarboxylic acids and diamines, from aminocarboxylic acids, from aminonitriles, from lactams, and from mixtures thereof. Starting monomers of any desired aliphatic polyamides can be involved here. The polyamides can be amorphous, crystalline, or semicrystalline. The polyamides can moreover have any desired suitable viscosities and, respectively, molecular weights. Particularly suitable polyamides have aliphatic, semicrystalline, or semiaromatic, or else amorphous, structure of any type.

The intrinsic viscosity of these polyamides is generally from 90 to 350 ml/g, preferably from 110 to 240 ml/g, determined in a 0.5% by weight solution in 96% by weight sulfuric acid at 25° C. to ISO 307.

Semicrystalline or amorphous resins with molecular weight (weight average) of at least 5000 are preferred, these being described by way of example in the following U.S. Pat. Nos. 2,071,250, 2,071,251, 2,130,523, 2,130,948, 2,241,322, 2,312,966, 2,512,606 and 3,393,210. Examples of these are polyamides which derive from lactams having from 7 to 11 ring members, e.g. polycaprolactam and polycapryllactam, and also polyamides which are obtained via reaction of dicarboxylic acids with diamines.

Dicarboxylic acids that can be used are alkanedicarboxylic acids having from 6 to 12, in particular from 6 to 10, carbon atoms, and aromatic dicarboxylic acids. Mention may be made here of the following acids: adipic acid, azelaic acid, sebacic acid, and dodecanedioic acid (=decanedicarboxylic acid).

Particularly suitable diamines are alkanediamines having from 2 to 12, in particular from 6 to 8, carbon atoms, and also di(4-aminocyclohexyl)methane or 2,2-di(4-aminocyclohexyl)propane.

Preferred polyamides are polyhexamethyleneadipamide (PA 66) and polyhexamethylenesebacamide (PA 610), polycaprolactam (PA 6), and also nylon-6/6,6 copolyamides, in particular having a proportion of from 5 to 95% by weight of caprolactam units. Particular preference is given to PA 6, PA 66, and nylon-6/6,6 copolyamides.

Mention may also be made of polyamides which are obtainable by way of example via condensation of 1,4-diaminobutane with adipic acid at an elevated temperature (nylon-4,6). Production processes for polyamides having this structure are described by way of example in EP-A 38 094, EP-A 38 582, and EP-A 39 524.

Other examples are polyamides which are obtainable via copolymerization of two or more of the abovementioned monomers, and mixtures of a plurality of polyamides, in any desired mixing ratio.

The following non-exhaustive list comprises the polyamides mentioned, and also other polyamides for the purposes of the invention (the monomers being stated between parentheses):

PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA 4 (pyrrolidone)
PA 6 (ε-caprolactam)
PA 7 (ethanolactam)
PA 8 (capryllactam)
PA 9 (9-aminononanoic acid)
PA11 (11-aminoundecanoic acid)
PA 12 (laurolactam)

These polyamides and production thereof are known. Details concerning their production are found by the person skilled in the art in Ullmanns Enzyklopädie der Technischen Chemie [Ullmann's Encyclopedia of Industrial Chemistry], 4th edition, vol. 19, pp. 39-54, Verlag Chemie, Weinmann 1980, and also Ullmann's Encyclopedia of Industrial Chemistry, vol. A21, pp. 179-206, VCH Verlag, Weinheim 1992, and also Stoeckhert, Kunststofflexikon [Plastics Encyclopedia], pp. 425-428, Hanser Verlag, Munich 1992 (keyword "Polyamide" [Polyamides] ff.).

It is particularly preferable to use nylon-6 or nylon-6,6.

It is moreover possible in the invention to provide functionalizing compounds in the polyamides, where these are capable of linkage to carboxy or amino groups and by way of example have at least one carboxy, hydroxy, or amino group. These are preferably monomers having branching effect, where these by way of example have at least three carboxy or amino groups,
monomers capable of linkage to carboxy or amino groups, e.g. via epoxy, hydroxy, isocyanato, amino, and/or carboxy groups, and which have functional groups selected from hydroxy groups, ether groups, ester groups, amide groups, imine groups, imide groups, halogen groups, cyano groups, and nitro groups, C—C double bonds, or C—C triple bonds,
or polymer blocks capable of linkage to carboxy or amino groups.

Use of the functionalizing compounds can adjust the property profile of the resultant polyamides as desired within a wide range.

By way of example, triacetonediamine compounds can be used as functionalizing monomers. These preferably involve 4-amino-2,2,6,6-tetramethylpiperidine or 4-amino-1-alkyl-2,2,6,6-tetramethylpiperidine, where the alkyl group in these has from 1 to 18 carbon atoms or has been replaced by a benzyl group. The amount present of the triacetonediamine compound is preferably from 0.03 to 0.8 mol %, particularly preferably from 0.06 to 0.4 mol %, based in each case on 1 mol of amide groups of the polyamide. Reference can be made to DE-A-44 13 177 for further details.

The phosphorus-containing organic polymers can be used alone or in combination with other flame-retardant substances and synergists as component C.

Other flame-retardant substances can by way of example be red phosphorus, cyclic phenoxyphosphazenes having at least phenoxyphosphazene units, or (di)phosphinate salts.

It is moreover also possible to use reaction products of melamine with a phosphoric acid, or to use metal borates.

Preferred reaction products of melamine with a phosphoric acid are products which are obtained through reaction of in essence equimolar amounts of melamine or of a condensate of melamine with phosphoric acid, pyrophosphoric acid, or polyphosphoric acid by suitable processes. It is particularly preferable to use melamine polyphosphate, which can be obtained through condensation of melamine phosphate by heating under nitrogen. The general formula of melamine polyphosphate is $(C_3H_6N_6HPO_3)_n$.

The phosphorus acid component in the melamine phosphate is by way of example ortho-phosphoric acid, phosphorous acid, hypophosphorous acid, metaphosphoric acid, pyrophosphoric acid, triphosphoric acid, or tetraphosphoric acid. Particular preference is given to melamine polyphosphate which is obtained through condensation of an adduct of ortho-phosphoric acid or pyrophosphoric acid with melamine. The degree of condensation of the melamine polyphosphate is preferably 5 or greater. Alternatively, the melamine polyphosphate can also be an equimolar adduct salt of polyphosphoric acids with melamine. It is also possible to use cyclic polymetaphosphoric acid, alongside non-cyclic polyphosphoric acid. The adduct salt of melamine polyphosphate is generally a powder which is obtained through reaction of an aqueous slurry of a mixture of melamine with polyphosphoric acid and subsequent isolation by filtration, washing, and drying. The grain size of the melamine polyphosphate can be adjusted within wide limits, and in this connection reference can also be made to EP-A-2 100 919, paragraph [0026].

Suitable phosphinate salts have the general formula $[R^1R^2P(=O)—O]^-{}_mM^{m+}$. Suitable (di)phosphinates have the general formula $[O—P(=O)R^1—O—R^3—O—P(=O)R^2—O]^{2-}{}_nM_x{}^{m+}$, where $R^1$ and $R^2$ are mutually independently linear or branched $C_{1-6}$-alkyl moieties or $C_{6-10}$-aryl moieties, $R^3$ is a linear or branched $C_{1-10}$-alkylene moiety, $C_{6-10}$-arylene moiety, $C_{7-10}$-alkylarylene moiety, or $C_{7-10}$-arylalkylene moiety, M is Ca, Mg, Al, or Zn, m is the valency of M, determined from 2n=mx, n is the value 1 or 3, and x is the value 1 or 2. If the value of m or n is 2 or more, the moieties $R^1$ to $R^3$ can be selected freely at each position.

Examples of suitable phosphinic salts are dimethylphosphinate, ethylmethylphosphinate, diethylphosphinate, methyl-n-propylphosphinate, methanedi(methylphosphinate), benzene-1,4-di(methylphosphinate), methylphenylphosphinate, and diphenylphosphinate. The metal component M is a calcium ion, magnesium ion, aluminum ion, or zinc ion.

Examples of suitable phosphinate salts are calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

Examples of suitable diphosphinate salts are calcium methanedi(methylphosphinate), magnesium methanedi(methylphosphinate), aluminum methanedi(methylphosphinate), zinc methanedi(methylphosphinate), calcium benzene-1,4-di(methylphosphinate), magnesium benzene-1,4-di(methylphosphinate), aluminum benzene-1,4-di(methylphosphinate), and zinc benzene-1,4-di(methylphosphinate).

It is particularly preferable to use phosphinate salts, in particular aluminum ethylmethylphosphinate, aluminum diethylphosphinate, and zinc diethylphosphinate. It is particularly preferable to use aluminum diethylphosphinate.

The (di)phosphinate salts can be used in any desired suitable grain size, see EP-A-2 100 919, paragraph [0032].

The thermoplastic molding composition can comprise at least one impact-modifying polymer as component D.

Component D used comprises from 0 to 20% by weight, preferably from 0 to 10% by weight, in particular from 0 to 8% by weight, of at least one impact-modifying polymer. If an impact-modifying polymer is present, the minimum amount is 0.1% by weight, preferably 1% by weight, in particular 3% by weight. The maximum possible amount of component A decreases correspondingly, so that the entire amount of components A to F gives 100% by weight. Concomitant use of component D is not essential, but use thereof can improve the impact-resistance capability of the resultant polyamide molding compositions. Impact-modifying polymers involved here are those that are typically used for impact-modification of the polyamides of component A. It is preferable that an elastomer is involved, examples being natural or synthetic rubbers and other elastomers.

Synthetic rubbers that may be mentioned and that can be used are ethylene-propylene-diene rubber (EPDM), styrene-butadiene rubber (SBR), butadiene rubber (BR), nitrile rubber (NBR), hydrin rubber (ECO), and acrylate rubbers (ASA). It is also possible to use silicone rubbers, polyoxyalkylene rubbers, and other rubbers.

The following may be mentioned as thermoplastic elastomers: thermoplastic polyurethane (TPU), styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS).

Resins can moreover be used as blend polymers, for example urethane resins, acrylic resins, fluoro resins, silicone resins, imide resins, amide-imide resins, epoxy resins, urea resins, alkyd resins, or melamine resin.

Ethylene copolymers can moreover be used as blend polymer, examples being copolymers of ethylene and 1-octene, 1-butene, or propylene, these being as described in WO 2008/074687. The molar masses of ethylene-α-olefin copolymers of the abovementioned type are preferably in the range from 10 000 to 500 000 g/mol, preferably from 15 000 to 400 000 g/mol (number-average molar mass). It is also possible to use straight polyolefins, such as polyethylene or polypropylene.

For suitable polyurethanes, reference can be made to EP-B-1 984 438, DE-A-10 2006 045 869 and EP-A-2 223 904.

Other suitable thermoplastic resins are listed in paragraph [0028] of JP-A-2009-155436.

Other polymers suitable as component F are mentioned in paragraph [0044] in EP-A-2 100 919.

Copolymers of ethylene and acrylates, acrylic acid, and/or maleic anhydride are particularly preferably used as component F. It is particularly preferable to use copolymers of ethylene, n-butyl acrylate, acrylic acid, and maleic anhydride. A corresponding copolymer is obtainable as Lupolen® KR1270 from BASF SE.

Component E

The thermoplastic molding compositions comprise, as component E, from 0 to 50% by weight, or if present from 1 to 50% by weight, preferably from 10 to 35% by weight, in particular from 20 to 30% by weight, for example about 25% by weight, of glass fibers. It is possible here to use any desired suitable glass fibers in the form of chopped glass or in the form of rovings. It is preferable that the diameter of the chopped glass fibers is about 10 μm. The glass fibers can have been surface-treated, for example silanized. Concomitant use of the glass fibers is particularly advantageous.

Component F

The thermoplastic molding compositions of the invention can comprise, as component F, from 0 to 30% by weight of further additives. Said additives can involve other fillers, stabilizers, oxidation retarders, agents providing protection from decomposition by heat and decomposition by ultraviolet light, flame retardants, lubricants and mold-release agents, colorants such as dyes and pigments, nucleating agents, plasticizers, etc. For a more detailed description of possible additives, reference can be made to pages 31 to 37 of WO 2008/074687.

It is preferable that from 0.1 to 20% by weight of component F is present (the amount of component A being correspondingly reduced), where component F comprises stabilizers and lubricants. By way of example, zinc oxide can be used as stabilizer, and calcium stearate can be used as lubricant. Conventional antioxidants for polyamide molding compositions can be used, for example the antioxidants marketed with trademark Irganox® by BASF SE.

Other fillers that can be used are carbon fibers, aromatic polyamide fibers, and other fillers such as gypsum fibers, synthetic calcium silicates, kaolin, calcined kaolin, wollastonite, talc powder, and chalk.

It is also possible that, alongside the flame retardants of components B to E, other flame retardants are also used concomitantly as additives of component F, for example those based on triazines, on metal hydrates, and on silicones. A typical flame-retardant substance based on triazines is melamine cyanurate.

Other additional flame-retardant substances can be metal compounds such as magnesium hydroxide, aluminum hydroxide, zinc sulfate, iron oxide, and boron oxide, see also EP-A-2 100 919, paragraphs [0046] to [0048].

Other flame-retardant substances having synergistic effect are mentioned by way of example in paragraphs [0064] and [0065] in U.S. 2010/0261818.

The molding compositions of the invention are produced by mixing of components A to F. Extruders, such as single- or twin-screw extruders, or other conventional plastifying devices, such as Brabender mixers or Banbury mixers, are advantageously used for this purpose.

The sequence of mixing of the individual components here can be selected freely.

The molding compositions of the invention feature improved flame retardancy, combined with improved tensile strain at break and Charpy impact resistance. They are suitable for the production of moldings, fibers, or foils.

The invention also provides corresponding moldings, fibers, or foils made of the thermoplastic molding composition described above.

The examples below provide further explanation of the invention.

SYNTHESIS EXAMPLE

Provision of the Styrene-Butadiene (SB) Block Copolymer

Production of suitable SB block copolymers is described by way of example in EP 0 859 803 B1, and specifically example 3 with S-(S/B)3-S architecture was used here.

Example 1: Sulfonation of SB Block Polymers 10.0 g of SB block copolymer from EP 0 859 803 B1, example 3 (35% Bu/65% S) and 250 ml of anhydrous dichloroethane are used as initial charge in a nitrogen-inertized glass apparatus. Once the polymer has dissolved, the system is cooled to from −10 to −15° C. and 0.18 g of chlorosulfonic acid, dissolved in 50 ml of anhydrous dichloroethane, is metered into the system in 1 h, with stirring. After 30 minutes of continued reaction, 0.56 g of tributylamine is added in order to neutralize the HCl liberated and the sulfonic acid group. For the elemental analysis for S the procedure is: precipitation of 10 ml of the reaction solution in water, filtration, washing with ethanol, and drying for 15 h at 50° C./20 mbar.

Elemental analysis for S: 0.59 g/100 g (theory: 0.50 g/100 g, corresponding to 2.5% of the phenyl units).

Example 2: Phosphorylation of Sulfonated SB Copolymers 300 ml of diethylene glycol diethyl ether (DEGDE) and 67.0 g of diethyl phosphite (15-fold excess, based on olefinic double bonds) are used as initial charge in a glass apparatus. After heating to 120° C., 5.0 g of sulfonated SB copolymer from example 1 and 9.7 g of di-tert-butyl peroxide, each dissolved in 70 ml of DEGDE, are metered into the system over 24 h, and reaction is allowed to continue for 8 h. The phosphorylated polymer is precipitated in water, washed with water and ethanol, filtered, and dried for 12 h at 70° C./20 mbar.

Elemental analysis for P: 6.6 g/100 g (theory: 10.5 g/100 g; degree of phosphorylation=63%)

Example of Flame-Retardant Thermo Plastic Molding Composition

PA 6

Component A: Nylon-6, from BASF SE, Ultramid® B27

Component B1: Ethylene-octene copolymer modified with maleic anhydride, Fusabond® MN493, DuPont Component B2: Ethylene-acrylate copolymer, Lupolen® KR1270, BASF SE Component B3: Phosphorylated SB copolymer from example 2

Component C: Glass fiber, 10 μm, OCF 1110, Dow Corning

Component D1: Aluminum diethylphosphinate flame retardant, Exolit® OP 1230, Clariant
Component D2: Melamine polyphosphate flame retardant, Melapur® M200, BASF SE
Component E: Zinc borate
Component F: Alugel® 30DF aluminum stearate, Bärlocher AG
Component G: Irganox® 1098 antioxidant, BASF SE

TABLE 1

Phosphorylated SB copolymer from example in reinforced PA6

|  | comp. 1 | comp. 2 | comp. 3 | Example 1 |
|---|---|---|---|---|
| A | 54.45 | 39.45 | 39.45 | 39.45 |
| B1 |  | 15 |  |  |
| B2 |  |  | 15 |  |
| B3 |  |  |  | 15 |
| C | 25 | 25 | 25 | 25 |
| D1 | 12.7 | 12.7 | 12.7 | 12.7 |
| D2 | 6.3 | 6.3 | 6.3 | 6.3 |
| E | 1 | 1 | 1 | 1 |
| F | 0.2 | 0.2 | 0.2 | 0.2 |
| G | 0.35 | 0.35 | 0.35 | 0.35 |
| Tensile modulus/MPa | 8900 | 8800 | 8900 | 8900 |
| Tensile stress at break/MPa | 130 | 110 | 115 | 110 |
| Tensile strain at break/% | 3.2 | 3.5 | 3.5 | 3.6 |
| Charpy notched impact resistance/kJ/m$^2$ | 70 | 90 | 95 | 95 |
| UL 94, 0.8 mm | V-0 | failed | failed | V-0 |

PA66—Flame Retardancy Package Based on Aluminum Diethylphosphinate
Component A: Nylon-6,6, Ultramid® A27; BASF SE
Component B1: Ethylene-octene copolymer modified with maleic anhydride, Fusabond® MN493, DuPont
Component B2: Ethylene-acrylate copolymer, Lupolen® KR1270, BASF SE
Component B3: Phosphorylated SB copolymer from synthesis example
Component C: Glass fiber, 10 μm, OCF 1110, Dow Corning
Component D1: Aluminum diethylphosphinate flame retardant, Exolit® OP 1230, Clariant
Component D2: Melamine polyphosphate flame retardant, Melapur® M200, BASF SE
Component E: Zinc borate
Component F: Alugel® 30DF aluminum stearate, Bärlocher AG
Component G: Irganox® 1098 antioxidant, BASF SE

TABLE 2

Phosphorylated SB copolymer from synthesis example in reinforced PA66

|  | Comparison 1 | Comparison 2 | Comparison 3 | Example 1 |
|---|---|---|---|---|
| A | 54.45 | 39.45 | 39.45 | 39.45 |
| B1 |  | 15 |  |  |
| B2 |  |  | 15 |  |
| B3 |  |  |  | 15 |
| C | 25 | 25 | 25 | 25 |
| D1 | 12.7 | 12.7 | 12.7 | 12.7 |
| D2 | 6.3 | 6.3 | 6.3 | 6.3 |
| E | 1 | 1 | 1 | 1 |
| F | 0.2 | 0.2 | 0.2 | 0.2 |
| G | 0.35 | 0.35 | 0.35 | 0.35 |
| Tensile modulus/MPa | 9300 | 9200 | 9200 | 9200 |
| Tensile stress at break/MPa | 140 | 125 | 130 | 125 |
| Tensile strain at break/% | 3 | 3.5 | 3.5 | 3.5 |
| Charpy notched impact resistance/kJ/m$^2$ | 60 | 90 | 85 | 85 |
| UL 94, 0.8 mm | V-0 | failed | failed | V-0 |

PA 66—Flame Retardancy Package Based on Red Phosphorus
Component A: Nylon-6,6, Ultramid® A27; BASF SE
Component B1: Ethylene-octene copolymer modified with maleic anhydride, Fusabond® MN493, DuPont
Component B2: Ethylene-acrylate copolymer, Lupolen® KR1270, BASF SE
Component B3: Phosphorylated SB copolymer from synthesis example
Component C: Glass fiber, 10 μm, OCF 1110, Dow Corning
Component D1: Masteret 21440 red-phosphorus flame retardant, 40% of red phosphorus in PA66 masterbatch, Italmatch
Component E: Ultrabatch 190X stabilizer/lubricant, Great Lakes: 50% of zinc oxide, 25% of calcium stearate, 25% of Irganox® 98, BASF SE
Component F: Ultrabatch® 170 lubricant, 50% of stearyl stearate, 25% of zinc stearate, 25% of calcium stearate

TABLE 3

Phosphorylated SB copolymer from synthesis example in reinforced PA66

|  | Comparison 1 | Comparison 2 | Comparison 3 | Example 1 |
|---|---|---|---|---|
| A | 50.21 | 35.21 | 35.21 | 35.21 |
| B1 |  | 15 |  |  |
| B2 |  |  | 15 |  |
| B3 |  |  |  | 15 |
| C | 26 | 26 | 26 | 26 |
| D1 | 16.25 | 16.25 | 16.25 | 16.25 |
| E | 1.4 | 1.4 | 1.4 | 1.4 |
| F | 0.14 | 0.14 | 0.14 | 0.14 |
| Tensile modulus/MPa | 8500 | 6500 | 6500 | 6400 |
| Tensile stress at break/MPa | 120 | 110 | 105 | 115 |
| Tensile strain at break/% | 3.1 | 4 | 5.5 | 5 |
| Charpy notched impact resistance/kJ/m$^2$ | 45 | 70 | 70 | 70 |
| UL 94, 0.8 mm | V-0 | failed | failed | V-0 |

PBT—Polybutylene Terephthalate
Component A: Polybutylene terephtalate from BASF SE with intrinsic viscosity 107 ml/g (measured on a 0.5% (w/w) solution in a 1:1 phenol-dichlorobenzene mixture at 23° C.), Ultradur® B2550
Component B1: Ethylene-octene copolymer modified with maleic anhydride, Fusabond® MN493, DuPont
Component B2: Elvaloy® PTW ethylene-n-butyl acrylate-glycidyl methacrylate terpolymer, DuPont
Component B3: Phosphorylated SB copolymer from synthesis example
Component C: PPG 3786 glass fiber, diameter 10 μm, standard fiber length: 4.5 mm, PPG
Component D1: Aluminum diethylphosphinate flame retardant, Exolit® OP 1240, Clariant
Component D2: Melamine polyphosphate flame retardant, Melapur® M200, BASF SE Component D3: Melapur® MC25 melamine cyanurate flame retardant, BASF SE
Component E: Luwax® 0A5 polyethylene wax lubricant, BASF SE

TABLE 4

Phosphorylated SB copolymer from synthesis example in reinforced PBT

|   | Comparison 1 | Comparison 2 | Comparison 3 | Example 1 |
|---|---|---|---|---|
| A | 52.2 | 37.2 | 37.2 | 37.2 |
| B1 |  | 15 |  |  |
| B2 |  |  | 15 |  |
| B3 |  |  |  | 15 |
| C | 25 | 25 | 25 | 25 |
| D1 | 15 | 15 | 15 | 15 |
| D2 | 3.75 | 3.75 | 3.75 | 3.75 |
| D3 | 3.75 | 3.75 | 3.75 | 3.75 |
| E | 0.3 | 0.3 | 0.3 | 0.3 |
| Tensile modulus/MPa | 10 300 | 10 000 | 9500 | 9500 |
| Tensile stress at break/MPa | 110 | 105 | 105 | 105 |
| Tensile strain at break/% | 2.3 | 3 | 3 | 3 |
| Charpy notched impact resistance/kJ/m$^2$ | 45 | 80 | 85 | 85 |
| UL 94, 0.8 mm | V-0 | failed | failed | V-0 |

Processing

The components were extruded in a twin-screw extruder with L/D ratio 25. The compounding temperature during the process was 290° C. for PA66 and 270° C. for PA6 and PBT. Throughput was 25 kg/h. Screw speed was 350 rpm. The resultant polymer strands were pelletized and injection-molded appropriately for the production of the test specimens.

Flame Tests

Flame tests were carried out in accordance with UL 94 (Underwriters Laboratories) with test specimen thickness 0.8 mm.

The invention claimed is:

1. A process for producing a phosphorus-containing organic polymer, the process comprising:
reacting at least one dialkyl phosphite with at least one organic polymer comprising at least one carbon-carbon double bond in the presence of at least one organic compound that forms free radicals during said reacting, with covalent linkage of the phosphorus atom of the dialkyl phosphite to a carbon atom of the organic polymer,
wherein:
the organic polymer has from 0.01 to 50 mol %, based on monomer units of the organic polymer, of ionic groups; and
the organic polymer has a number-average molecular weight ($M_n$) ranging from 2000 to 300000.

2. The process according to claim 1, wherein the ionic groups are selected from the group consisting of a carboxylate, a sulfinate group, a sulfonate group and a sulfate group.

3. The process according to claim 2, wherein the organic polymer is a sulfonated organic polymer.

4. The process according to claim 1, wherein the organic polymer is a random copolymer or a di- or multiblock copolymer.

5. The process according to claim 1, wherein the carbon-carbon double bond is present in a main polymer chain within the organic polymer.

6. The process according to claim 5, wherein the organic polymer has polymerized units of vinylaromatic monomers and diene monomers.

7. The process according to claim 6, wherein the organic polymer has, in each case based on the organic polymer, from 10 to 70% by weight of copolymerized units of vinylaromatic monomers and from 30 to 90% by weight of copolymerized units of diene monomers, and wherein from 0.5 to 5% of the aromatic units have been sulfonated.

8. The process according to claim 7, wherein the organic polymer has, in each case based on the organic polymer, from 20 to 60% by weight of copolymerized units of vinylaromatic monomers and from 40 to 80% by weight of copolymerized units of diene monomers, and wherein from 1 to 4% of the aromatic units have been sulfonated.

9. The process according to claim 1, wherein the phosphorus-containing organic polymer is hydrolyzed to form phosphonic acid groups.

* * * * *